Sept. 20, 1932.   C. F. WALLACE   1,878,076
ELECTRICALLY ENERGIZED MOTOR
Filed March 7, 1929
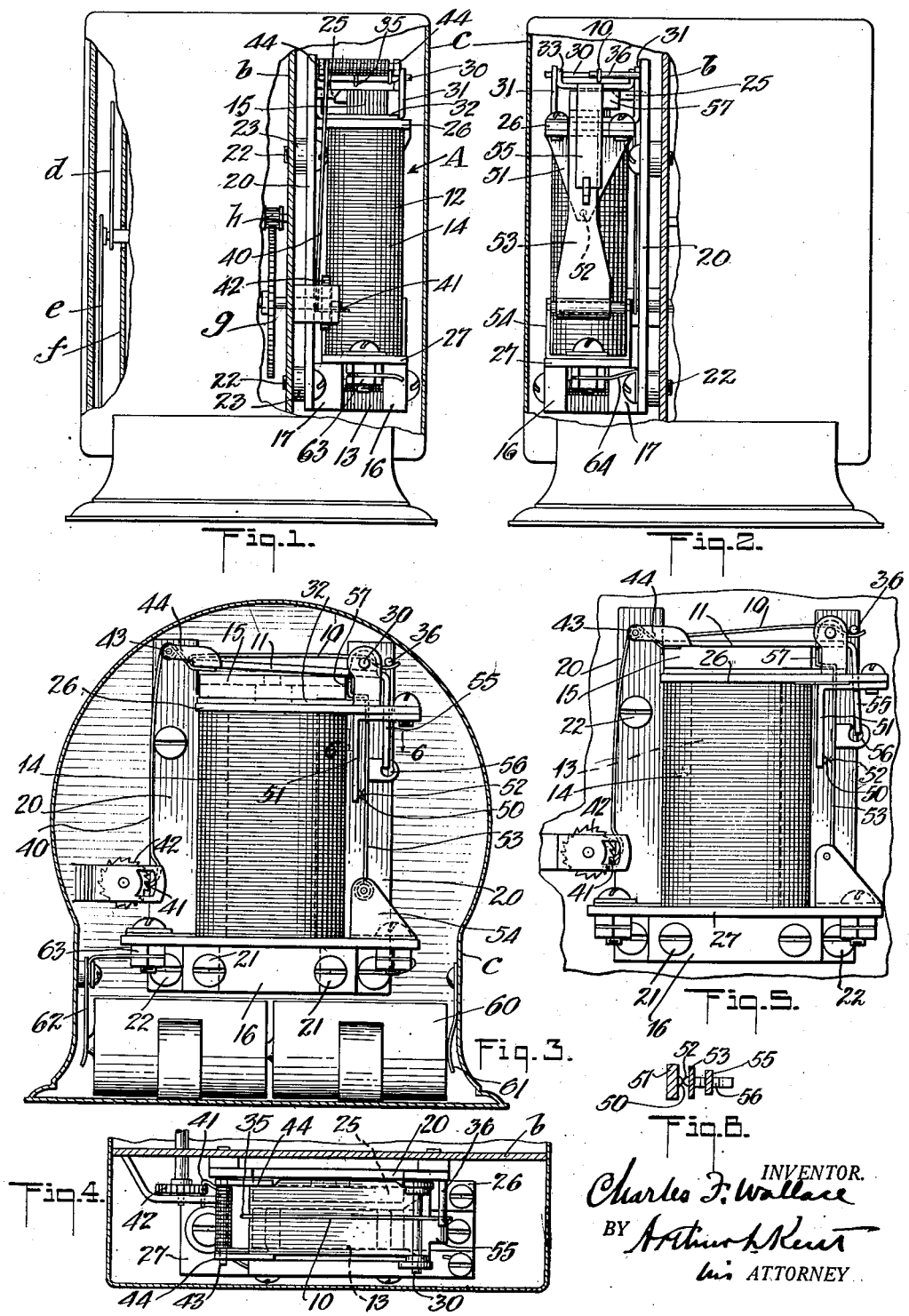
INVENTOR.
Charles F. Wallace
BY
his ATTORNEY Patented Sept. 20, 1932

1,878,076

UNITED STATES PATENT OFFICE

CHARLES F. WALLACE, OF WESTFIELD, NEW JERSEY, ASSIGNOR TO WALLACE & TIERNAN PRODUCTS, INC., OF BELLEVILLE, NEW JERSEY, A CORPORATION OF NEW JERSEY

ELECTRICALLY ENERGIZED MOTOR

Application filed March 7, 1929. Serial No. 345,193.

This invention relates to electrically energized motors, and more especially spring motors, of that class in which the motor spring, or other motor member, is intermittently tensioned, or energized, by the movement of the armature of an electromagnet, the armature being moved away from the magnet by the power of the motor spring when the magnet circuit is open, and the magnet circuit being automatically controlled to cause the magnet to attract its armature whenever the armature under the action of the motor spring has been moved a predetermined distance away from the magnet pole, and to open the magnet circuit when the armature has made its spring tensioning movement.

The object of the invention is to provide an improved apparatus of this kind which shall be of simple and compact construction and efficient and reliable in operation.

The invention is specially intended and adapted for spring motors for driving time trains of clocks or other apparatus, but the invention is adapted for and may be found useful for motors other than those employed for driving clock work mechanism, and features of the invention may be employed in connection with motors other than spring motors.

A full understanding of the invention can best be given by a detailed description of an approved apparatus embodying the invention, and such description will now be given in connection with the accompanying drawing, illustrating a spring motor unit embodying the various features of the invention in the form now considered best and mounted as the driving unit of a clock. In said drawing:—

Fig. 1 is a side elevation of the clock with parts of the casing broken away and showing the electrically energized spring motor unit in side elevation;

Fig. 2 is a similar view looking from the opposite side of the clock;

Fig. 3 is a view looking from the right of Fig. 1, showing the motor unit in elevation and the clock casing in section;

Fig. 4 is a plan view of the motor unit with the clock casing shown in section and partly broken away;

Fig. 5 is a view in elevation of the motor unit showing the motor unit as it appears in Fig. 3, but with the armature in position at the end of its spring energizing movement; and Fig. 6 is a detail sectional view taken on line 6—6 of Fig. 3.

Referring to the drawing, the motor unit A is mounted on a partition plate $b$ within the clock casing $c$. The clock hands $d$ and $e$ are shown in Fig. 1 in front of the dial plate $f$, and a gear wheel $g$ and pinion $h$ forming part of the clock work train also appear in Fig. 1.

The motor unit comprises a spring 10 by which the clock train is driven and which is tensioned at intervals by the movement of the armature 11 of an electromagnet 12. The magnet is designed for compactness and efficiency, giving large power with small current consumption. It is of U type, having a coil, or winding, on only one leg. The core or leg 13 which carries the coil 14 has lateral extensions at its upper end to form an elongated pole piece 15, and it is best of the usual laminated construction as shown. The other end of the core 13 extends below the lower end of the coil between clamping blocks 16 and 17 which are clamped to the end of the core and secured to a plate 20 by screws 21. The plate 20 is of magnetic material and forms the other leg of the magnet. It is somewhat wider and vertically longer than the core 13 and coil 14 and is secured to the partition plate $b$ by means of screws 22 and spacing pieces 23. The plate 20 thus provides for conveniently supporting the magnet and associated parts, in addition to serving as part of the magnet circuit.

The upper end of the plate 20 is cut and its intermediate portion bent over to form a thin elognated pole piece 25 projecting toward the pole piece 15. The upper faces of the two pole pieces are in the same plane or substantially so, and their adjacent edges are parallel and spaced to leave a narrow elongated air gap between them, and the edge of the pole piece 25 is most desirably bevelled off downwardly as shown. The flat form of the legs of the magnet gives a very compact construction, one much more compact than the ordinary U-magnet having cylindrical legs. Further, the use of one coil only gives a more compact construction than one in which two coils are used, one on each leg of the magnet. The use of a long narrow air gap immediately beneath the armature gives a magnetic circuit of low reluctance and hence enables a magnetic flux of the necessary intensity to be obtained by a minimum expenditure of electrical energy.

A plate 26 of insulating material through which the core 13 passes is held against the upper end of the magnet coil by the extending ends of the pole piece 15, and a plate 27 also of insulating material is held against the lower end of the coil by the blocks 16 and 17.

The armature 11 is formed by a plate of sufficient size to overlie the two pole pieces 15 and 25, and is pivoted at one end on a pin 30 carried by standards 31 extending upward from a plate 32 through which the core 13 passes and which is held between the insulating plate 26 and the ends of the pole piece 15. The pin 30 passes through upwardly extending ears 33 at the end of the armature. The pin 30 extends transversely of the length of the pole pieces and of the air gap between them, and is so positioned adjacent one end of the pole pieces that the pivoted end of the armature will be close to the face of the pole pieces even when the free end of the armature has been moved away from the magnet poles. A part of the armature will thus always be in position to be strongly attracted when the magnet is energized.

The driving spring 10 in the construction shown is formed by a piece of spring wire the active or free end of which is bent back and hooked under the free end of the armature as shown at 35, and the other end of which passes over the pivot pin 30 and extends beneath a pin 36, by which it is held under suitable tension so that it tends to swing the armature away from the magnet poles and that when the armature is drawn toward the poles the tension of the spring is restored.

The power exerted by the spring 10 is transmitted to the shaft of the gear $g$ of the clock train by a spring arm 40 formed by a piece of spring wire which extends downward from the end of the armature and has its lower end bent over to form a pawl 41 to cooperate with a ratchet wheel 42 on the shaft of the gear $g$. At the upper end of the arm the wire is coiled about a pin 43 carried by ears 44 extending from the end of the armature, and the end of the wire beyond the coil engages beneath the end of the armature to hold the arm 40 under tension so that its bent-over end, or pawl, 41 is yieldingly held against the ratchet wheel 42. As the armature is moved upward by the driving spring 10, therefore, the pawl 41 moves upward and turns the ratchet wheel; and when the armature is attracted by the magnet and moves downward to restore the energy of the driving spring the pawl is moved downward to engage a lower tooth of the ratchet wheel.

The magnet circuit is controlled by a make-and-break device actuated by the movement of the armature. This device comprises a fixed contact 50 carried by a bracket 51 extending downward from the insulating plate 26, and a movable contact 52 carried by a pivoted arm, or lever, 53 which extends upward from its pivotal connection to a bracket 54 secured to the insulating plate 27. An actuating arm 55 extending downward from the pivoted end of the armature extends at its lower end into an opening 56 in a lug on the contact arm 53. The opening 56 is somewhat wider than the thickness of the end of the arm 55 so as to provide for lost motion between the actuating arm and the contact arm.

When the armature reaches a certain point in its upward movement under pull of the spring 10, the end of the actuating arm 55 comes into engagement with the inner edge of the opening 56, and then on further upward movement of the armature the contact arm is moved inward until its contact 52 comes into engagement with the fixed contact 50, thereby closing the magnet circuit. The armature is then drawn downward by the magnet and the actuating arm 55 swings outward. The actuating arm comes into engagement with the outer edge of the opening 56 before the armature reaches the end of its downward movement, and continued outward movement of the actuating arm as the armature completes its downward movement then moves the contact arm outward to carry its contact 52 away from the fixed contact 50, thereby opening the magnet circuit to deenergize the magnet and release the armature so that the armature may again be moved gradually upward by the spring 10 as the latter drives the clock train.

The contact arm 53 is extended upward above the contact 52 and has at its upper end a small plate, or armature, 57 positioned near the end of the pole piece 15. Immediately when the magnet circuit has been closed by inward movement of the contact arm, this auxiliary armature is attracted toward the pole piece and the contact 52 is thereby held tightly against the contact 50 during the downward movement of the main armature 11 until armature 11 moves the contact arm outward to break the magnet circuit. Imperfect contact and chattering are thus avoided. The contact arm 53 is most desirably made from a plate or sheet of magnetic metal and has its upper end bent inward and then upward to form the auxiliary armature 57.

The arrangement of the armature and the make-and-break device has important advantages over constructions heretofore used. By providing a make-and-break device, one contact of which is rigidly mounted or fixed as distinguished from a spring mounted contact, and the other of which is mounted to move in a direction normal to the plane of contact, the contacts have a non-sliding engagement. Contact surfaces which make a sliding engagement require more or less frequent cleaning to keep them in good working condition over long periods of operation. The necessity of such cleaning is avoided by my pressure-contact make-and-break device. Sure initial closing of the contacts is secured by having the movable contact member moved positively against the fixed contact by direct application of the power of the driving spring 10. Perfect contact at the end of each outward movement of the armature 11 and during long continued operation of the device is thus secured.

The movable contact having been moved positively into engagement with the fixed contact, the auxiliary armature 57 is then immediately attracted by the magnet and serves to hold the movable contact in circuit closing position during the movement of the main armature toward the magnet. Full inward movements of the main armature are thus assured, and all possibility of chattering avoided.

Furthermore, the upward movement of the armature 11 is limited by the engagement of the movable contact with the fixed contact, and the armature is thus always stopped in the same definitely fixed position even when no current is on the magnet circuit. Because of this, the energizing motor will always start on any current on which it will continue in operation. If the arrangement were such that the armature would move a greater distance away from the magnet poles when no current was supplied to the magnet, a current sufficient to keep the energizing motor in operation might not be sufficient to start it after an interruption of its operation.

Current for energizing the magnet may be supplied from any suitable source. The current consumption is small and the voltage required is low, and for a small clock-driving unit as shown, a small dry cell battery will furnish the required current for a comparatively long period, and may conveniently be housed within the clock casing, as shown at 60, being arranged in any suitable way for ready renewing. As shown, one pole of the battery is grounded to the casing $c$ through a contact spring 61, and the other pole of the battery makes contact with an insulated contact spring 62. The spring 62 is electrically connected to a binding post 63 on the insulating plate 27 to which one end of the magnet winding is connected. The other end of the magnet coil is connected to the racket 51 which carries the fixed contact 50, and the circuit is completed through the movable contact 52, contact arm 53 and bracket 54, the bracket 54 being grounded to the casing $c$ through a connection 64 to one of the screws 22.

The operation of the apparatus as a whole will be clear from the foregoing description, but may be briefly restated as follows: The armature 11 having been attracted by the magnet to re-tension the driving spring 10 and the magnet circuit having been opened, the energy of the driving spring will then be exerted through the arm 40 and pawl 41 to turn the ratchet wheel 42 and drive the clock train. As the spring thus gives up its energy, the armature moves gradually upward until the movable contact 52 is moved by the armature arm 55 into engagement with the fixed contact 50 to close the magnet-energizing circuit. The armature is then attracted by the magnet and moves downward to restore the energy of the driving spring, and the pawl 41 is moved downward to engage a lower tooth of the ratchet wheel. During the downward movement of the armature and until just before it reaches the end of its downward movement, the movable contact is held in engagement with the fixed contact by the auxiliary armature 57 which is attracted by the magnet. As the main armature comes to the end of its downward movement the armature arm 55 moves the movable contact away from the fixed contact, thereby opening the magnet circuit to de-energize the magnet, releasing the main armature and permitting the driving spring 10 again to exert driving force on the ratchet wheel 42 and gradually move the armature upward.

It will be understood that the invention is not to be limited to the exact construction shown by the drawing and to which the foregoing description has been largely confined, but that it includes changes and modifications thereof within the claims.

What I claim is:—

1. In an electrically energized motor, a U-type electromagnet one leg of which is provided with a winding and has an elongated pole piece, and the other leg of which is formed by a plate of greater width than the winding and having an end portion bent over to form a pole piece extending parallel to the first mentioned pole piece with a narrow air gap between them, and a pivoted motor-energizing armature opposite said pole pieces.

2. In an electrically energized motor, a U-type electromagnet one leg of which is provided with a winding and has an elongated pole piece, and the other leg of which is formed by a plate having an end flange forming a pole piece which extends parallel to the first mentioned pole piece with a narrow air gap between them, and a motor-energizing armature opposite said pole pieces.

3. An electrically energized spring motor, comprising a U-type electromagnet having a winding on only one leg, the other leg being formed by a plate and having an inwardly extending end flange forming a pole piece which extends parallel to the pole piece formed by the end of the leg having the winding with an elongated air gap between them, and a spring-tensioning armature pivoted to turn about an axis at one end of the air gap and transverse to the length thereof.

4. An electrically energized spring motor as set forth in claim 3, in which the edge of the pole-piece-forming flange is bevelled downwardly.

5. An electrically energized spring motor, comprising an electromagnet, a pivoted armature mounted to swing toward and away from the magnet, a driving spring having one end fixed adjacent the armature pivot and extending lengthwise of the armature and having its active end connected to the free end of the armature and tensioned to swing the armature away from the magnet, and a normally stationary contact member moved by the armature for closing the magnet circuit and for positively preventing further outward movement of the armature when the armature has moved away from the magnet to a predetermined position and for opening the circuit when the armature has made its spring tensioning movement.

6. An electrically energized spring motor, comprising an electromagnet, a spring-retracted pivoted armature mounted to swing toward and away from the magnet, means for controlling the magnet circuit comprising a fixed contact and a movable contact, an arm for actuating said movable contact extending from the pivoted end of the armature at one side of the magnet and having a lost-motion connection to the movable contact, an auxiliary armature connected with said movable contact for holding it against the fixed contact during the movement of the main contact armature toward the magnet, and a power transmitting connection extending from the free end of the armature at the other side of the magnet.

7. An electrically energized spring motor, comprising an electromagnet, a spring-retracted pivoted armature mounted to swing toward and away from the magnet, means for controlling the magnet circuit comprising a fixed contact and a movable contact, an arm for actuating said movable contact extending from the pivoted end of the armature at one side of the magnet and having a lost-motion connection to the movable contact, an auxiliary armature connected with said movable contact, and a power transmitting connection extending from the free end of the armature at the other side of the magnet.

8. An electrically energized spring motor, comprising a U-type electromagnet having a winding on one leg, the other leg being formed by a plate of magnetic metal, a spring-retracted armature mounted to move toward and away from the magnet, and means actuated by the movements of the armature for controlling the magnet circuit, said plate serving as a support for the coil carrying leg of the magnet and associated parts.

9. In an electrically energized motor, a U-type electromagnet having a pair of parallel elongated pole-pieces arranged side by side with a narrow air gap therebetween, and a motor energizing armature bridging the air gap having a length not materially less than that of said pole-pieces.

10. An electrically energized motor as in claim 9, in which the armature is pivoted adjacent to one end of the pole-pieces and at that end the latter are almost in contact with the armature in all operative positions of the latter.

11. In an electrically energized motor, a U-type electromagnet, an armature extending perpendicularly to the legs of the electromagnet and pivoted adjacent one side of the latter, a spring adapted to move the armature away from the electromagnet upon de-energization of the latter, a pawl reciprocating member connected to the armature adjacent the other side of the electromagnet and extending along and substantially parallel to the legs of the latter, a clock work train operated by said pawl, a contact opening and closing member attached to the armature adjacent the pivot of the latter and extending along and substantially parallel to the legs of the electromagnet toward the closed end thereof, and a pair of contacts in circuit with the electromagnet windings opened and closed by said contact opening and closing member.

In testimony whereof I have hereunto set my hand.

CHARLES F. WALLACE.